United States Patent
Brizel et al.

(10) Patent No.: US 10,962,442 B2
(45) Date of Patent: Mar. 30, 2021

(54) AUTOMATED SYSTEM TO VERIFY STRUCTURAL INTEGRITY OF A STRUCTURE

(71) Applicant: Alberta Centre for Advanced MNT Products, Edmonton (CA)

(72) Inventors: Kenneth Wayne Brizel, Edmonton (CA); Murray Paulson, Edmonton (CA); Ilya Utkin, Edmonton (CA); Nehla Ghouaiel, Edmonton (CA); Siamak Akhlaghi Esfahany, Edmonton (CA)

(73) Assignee: Alberta Centre for Advanced MNT Products, Edmonton (CA)

( * ) Notice: Subject to any disclaimer, the term of this patent is extended or adjusted under 35 U.S.C. 154(b) by 0 days.

(21) Appl. No.: 16/521,345

(22) Filed: Jul. 24, 2019

(65) Prior Publication Data
US 2020/0033227 A1  Jan. 30, 2020

Related U.S. Application Data

(60) Provisional application No. 62/702,515, filed on Jul. 24, 2018.

(51) Int. Cl.
| | | |
|---|---|---|
| *G01M 11/02* | (2006.01) | |
| *G06T 7/00* | (2017.01) | |
| *G01N 21/956* | (2006.01) | |
| *G01N 21/88* | (2006.01) | |

(52) U.S. Cl.
CPC ...... *G01M 11/025* (2013.01); *G01M 11/0264* (2013.01); *G01N 21/8851* (2013.01); *G01N 21/956* (2013.01); *G06T 7/0004* (2013.01); *G01M 11/0214* (2013.01); *G06T 2207/30136* (2013.01)

(58) Field of Classification Search
CPC .. G01N 21/88; G01N 21/8851; G01N 21/956; G01M 11/0214; G01M 11/025; G01M 11/0257; G01M 11/0264; G01M 11/0278; G06T 7/0002; G06T 7/0004; G06T 2207/30108; G06T 2207/30136
USPC ..... 356/237.1, 237.2, 237.6, 239.2; 382/141, 382/152
See application file for complete search history.

(56) References Cited

U.S. PATENT DOCUMENTS

| | | |
|---|---|---|
| 2009/0323046 A1 | 12/2009 | Tan et al. |
| 2016/0171622 A1* | 6/2016 | Perkins ................. G06Q 40/08 705/4 |
| 2016/0210830 A1* | 7/2016 | Shaham .......... G08B 13/19621 |
| 2016/0291134 A1 | 10/2016 | Droz et al. |

(Continued)

FOREIGN PATENT DOCUMENTS

JP  2014095627 A  *  5/2014

*Primary Examiner* — Colin W Kreutzer
(74) *Attorney, Agent, or Firm* — Bennett Jones LLP

(57) ABSTRACT

A computer-implemented system and method for examining the integrity of a structure having a visually repetitive pattern such as a fence, includes an imaging system having a light source and an optical element to produce a narrow substantially vertical light beam, and a photodetector to receive reflected light. The light beam is directed at the structure while moving laterally, producing a planar image of the structure which is continually refreshed. The system processes the images and identifies an anomalous feature from an anomaly in the repetitive pattern.

12 Claims, 4 Drawing Sheets

(56) References Cited

U.S. PATENT DOCUMENTS

| | | | |
|---|---|---|---|
| 2016/0364851 A1* | 12/2016 | Konishi | G01N 21/8851 |
| 2017/0277966 A1* | 9/2017 | Abousleman | H04N 5/33 |
| 2018/0130196 A1* | 5/2018 | Loveland | G01C 11/02 |
| 2018/0339720 A1* | 11/2018 | Singh | B61K 9/08 |
| 2019/0187065 A1* | 6/2019 | Takahira | G01N 21/8806 |
| 2019/0212414 A1 | 7/2019 | Esfahany et al. | |
| 2019/0368133 A1* | 12/2019 | Joshi | G06T 7/11 |

\* cited by examiner

AUTOMATED SYSTEM TO VERIFY STRUCTURAL INTEGRITY OF A STRUCTURE

FIELD OF THE INVENTION

The present invention relates generally to methods and systems for determining the structural integrity of a structure, in particular a structure having a visually repetitive pattern, such as a fence.

BACKGROUND OF THE INVENTION

Finding anomalies in the structures that have repetitive pattern, and are to some extent semitransparent, is a difficult task that no easy solution is found so far. Verifying the integrity of a fence requires manual visual inspection along the entire fence, which can be a tedious and lengthy process. The task becomes more challenging when the lighting conditions changes (day to night), and/or the pattern of the object is relatively small.

There is a need in the art for automated systems or methods for verifying the structural integrity of structures, in particular those structures with visually repetitive patterns, such as fences.

SUMMARY OF THE INVENTION

In one aspect, the present invention comprises a method of determining the integrity of a structure having a visually repetitive pattern, comprising the steps of:

(a) using a laser light source and an optical element to produce a narrow vertical light beam and directing the light beam at the structure while continuously moving laterally;

(b) processing light reflected by the structure to produce a digital image; and (c) identifying an anomalous feature from an anomaly in the repetitive pattern.

In another aspect, the invention comprises a computer-implemented system for determining the integrity of a structure having a visually repetitive pattern, the system configured to receive digital images from a imaging system comprising a laser light source and an optical element to produce a narrow vertical light beam, which is configured to be directed at the structure while moving laterally, the system comprising a processor and at least one memory device in communication with the processor, the memory comprising processor-executable instructions to (a) process the images and identify an anomalous feature from an anomaly in the repetitive pattern.

In one embodiment, the system further comprises a display/report module which stores a record of an anomaly correlated to a geographic position, or reports the anomaly and its geographic position to a remote user or system, or both.

BRIEF DESCRIPTION OF THE DRAWINGS

In the drawings shown in the specification, like elements may be assigned like reference numerals. The drawings may not be to scale, with the emphasis instead placed upon the principles of the present invention. Additionally, each of the embodiments depicted are but one of a number of possible arrangements utilizing the fundamental concepts of the present invention.

DETAILED DESCRIPTION OF EMBODIMENTS OF THE INVENTION

In general, the methods and systems described herein may be used to identify anomalies in a structure having a visually repetitive pattern, such as a fence. The system may be operative in conditions which may not allow manual inspection, and is automated to reduce the possibility of human error or misjudgment. As will be appreciated by those skilled in the art, the system may be operated in daylight or in reduced-light conditions, which may allow around-the-clock operation, in any weather condition.

Definitions. Any term or expression not expressly defined herein shall have its commonly accepted definition understood by a person skilled in the art. As used herein, the following terms have the following meanings.

A "computer processor" or "processor" refers to an electronic device that is capable of processing an input electronic signal to produce an output electronic signal. In embodiments, a computer processor may include one or more devices commonly referred to as a programmable logic controller, a printed circuit board, an integrated circuit, a microcontroller, or the like. A "computing device" comprises at least one computer processor and typically includes computer-readable memory for storing instructions executable by the processor.

"Non-transitory computer-readable memory" refers to a tangible medium capable of storing data and/or instructions in a format readable by a computer processor. In embodiments, a non-transitory computer-readable memory may include magnetic media, optical media, or solid-state media.

A chain link fence is an exemplary structure with a visually repetitive pattern. The chain link is supported by vertical posts, which are arrayed at regular intervals.

Figure 1:
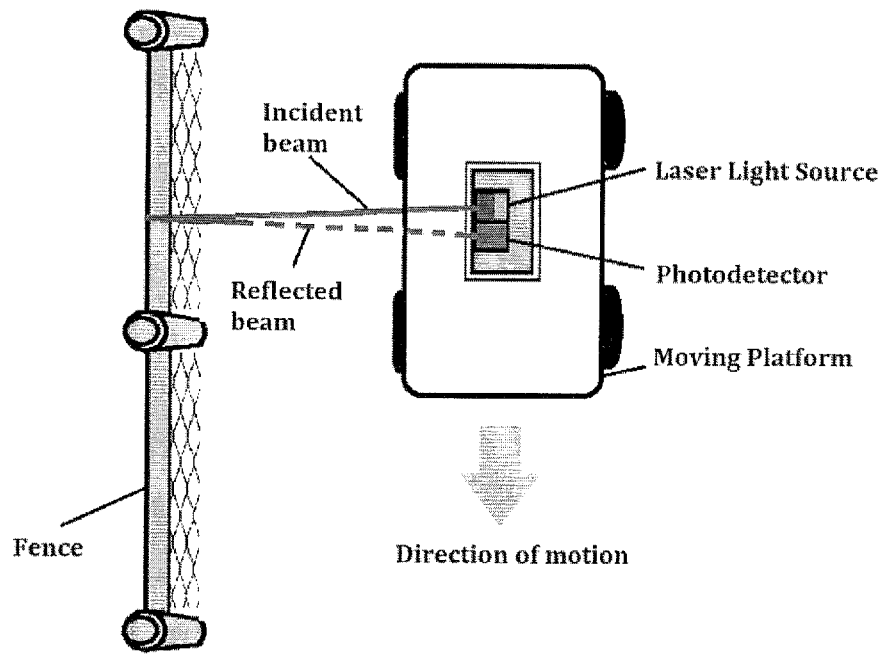
FIG. 1 shows a top-down view, showing a mobile platform, such as a data collection vehicle positioned immediately adjacent to a fence.

FIG. 1 shows a top-down view, showing a mobile platform, such as a data collection vehicle positioned immediately adjacent to a fence. The vehicle has a laser light source and an optical element, which preferably produces a relatively narrow, substantially vertical light beam. The dimensional width of the beam may be varied, however, a narrower beam may produce greater resolution. The width of the beam should not exceed the width of the repetitive pattern.

Obviously, the beam need not be exactly vertical, and in fact may be slanted, so long as it extends from the top of the fence to the bottom.

Figure 2:
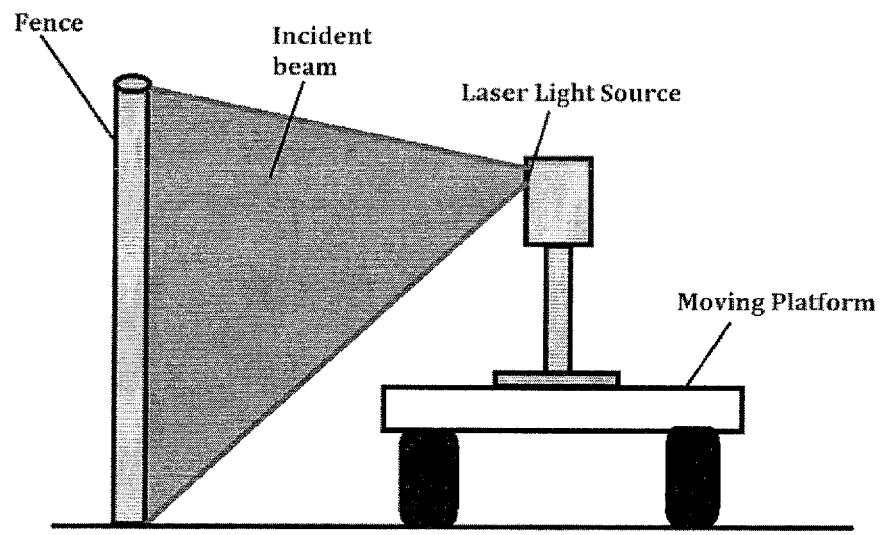
FIG. 2 shows the embodiment of FIG. 1 from a front view.

The height of the narrow vertical beam, at the distance of the fence, is substantially the same as the fence itself, as is shown in FIG. 2. Alternatively, a point source of light may be used to rapidly scan vertically from top to bottom of the fence to produce similar imagery.

Figure 3A:
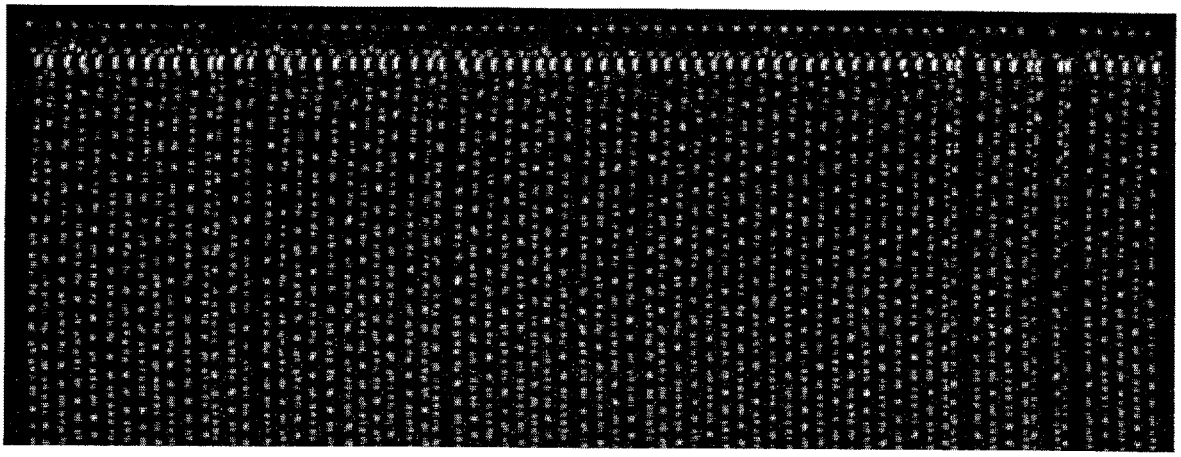
FIG. 3A shows a planar image created from cumulating the portion of the fence that is lit up by the line laser.
Figure 3B:
FIG. 3B is a photograph of the fence from which the image.
Figure 4:
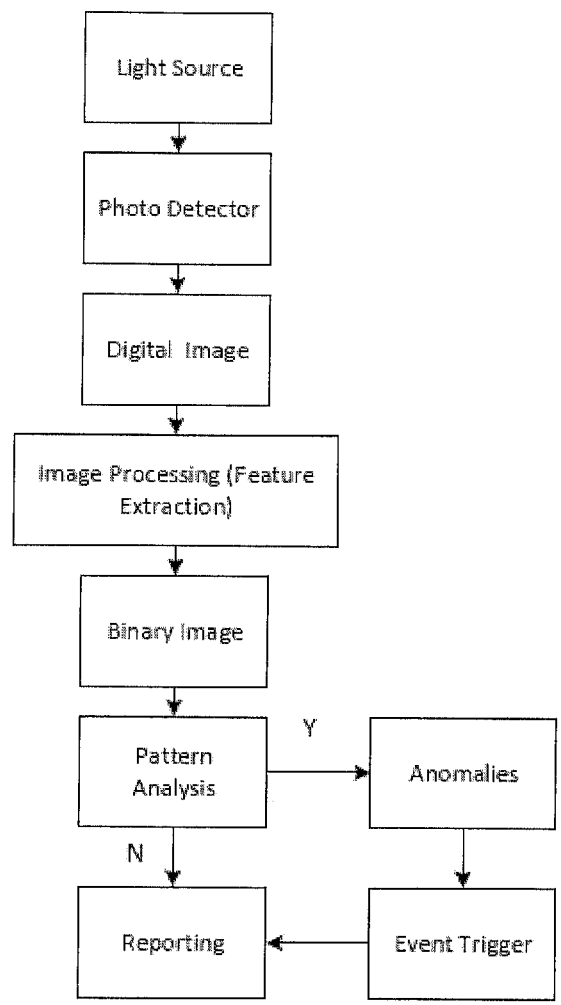
FIG. 4 shows a flowchart of one embodiment of an algorithm of the present invention.

The visual pattern of the fence is reflected back to a photodetector, which allows a digital image to be created. As the mobile platform moves laterally along the fence, the digital image is refreshed at the leading edge. The features of interest from each recorded image (the portion of the fence that is lit up by the line laser) are cumulated to create a planar view of the object (here the fence) perpendicular to the motion of the laser source, as is shown in FIG. 3A, while FIG. 3B is an photograph of the actual fence: The repetitive pattern of the fence is clearly visible and detectable.

In some preferred embodiments, the recorded consecutive images from the camera are processed on board and in real time. An adaptive thresholding method may be used to subtract all the features from the image but the features of interest (the fence in this case) in a feature extraction step. This step may be preceded by applying linear filters to improve the image quality.

The generated binary image from the last step may be analyzed for disruptions in the repetitive pattern, and/or analyzed against previously recorded images to check the integrity of the structure. If any anomalies, such as holes or gaps, are detected, an anomalous event will be triggered. The timing of the event is synchronized with the position sensor, the GNSS chip, to show the location of the detected event. For a calibrated camera, and based on the speed of the platform motion, one can determine the size of the anomalies (hole or gap). If an anomaly is found at a location, which is identical to a previously known anomaly to that specific location, the anomalous event may not be triggered. For example, the location of gates or other non-anomalous structures which may be detected may be ignored by the system.

Figure 5A:
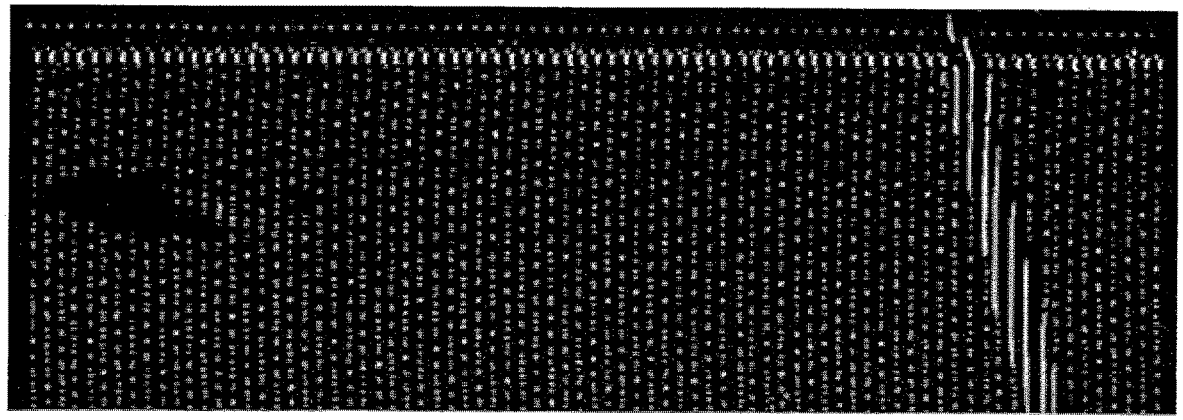
FIG. 5A shows a planar image with an anomaly resulting from a hole in the fence.
Figure 5B:
FIG. 5B is a photograph of the fence.

As shown in FIGS. 5A and 5B, a hole in the fence is visible and detectable. The bright vertical lines towards the right hand side of the image is a support pole, and may be recorded as such, or ignored.

In some embodiments, the mobile platform is not necessarily a vehicle, but is a robotic ground-based, marine or aerial platform, that may be autonomous or remotely controlled, or any other suitable ground-based mobile platform that is capable of traversing the terrain of the structure.

In some embodiments, the collection platform further comprises a geospatial positioning system (GNSS) device and antenna. An inertial measurement unit or IMU may work in conjunction with the GNSS device to provide location information as the collection platform is moved. A battery may provide backup or primary power to the system, as required. A communications module may provide a wireless network connection, such as by WiFi, cellular data, Bluetooth™ or the like. All these components may be connected to the processor as is well known in the art.

In some embodiments, at least one or both of the processor and the memory device are remote from other components of the collection platform. They may reside on the mobile platform, or may reside in a remote location entirely. The memory device stores processor-executable instructions for performing embodiments of methods described herein, and the processor is configured to execute at least those instructions.

The collection platform may be configured to communicate with other devices, remote from the collection platform (or any of the devices that the collection platform is comprised of) via any suitable mode of communication (e.g., wired or wireless communication links, or any suitable combination thereof).

The processor comprises any suitable processor, or combination of processors, including but not limited to a microprocessor, a central processing unit (CPU) and the like. Other suitable processing units are within the scope of present implementations.

The at least one memory device can comprise any suitable memory device, including but not limited to any suitable one of, or combination of, volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations.

As executed by the processor, those instructions enable the processor to determine an anomaly in a structure and associate the anomaly with a geographic location, based on GNSS data.

In some embodiments, the system may identify anomalies and transmit it for display on a screen (e.g., via a graphical user interface (GUI)) in real-time or near-real-time. In addition, or alternatively, the anomaly and its location may be written directly to a receiving application or database, either locally or after transmission to a remote location. In some embodiments, the GUI displays the desired collected data such as geographic location (which may be described by latitude, longitude, and the like). The GUI may be a display on a user's electronic device, such as a computer, a mobile/portable computing device or other suitable device. For example, the GUI may be a display on any suitable combination of portable electronic devices, mobile computing device, portable computing devices, tablet computing devices, laptop computing devices, PDAs (personal digital assistants), cellphones, smartphones and the like. Other suitable portable electronic devices are within the scope of present implementations.

Interpretation. Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Those skilled in the art will appreciate that in some implementations, the functionality of the described systems, and components, can be implemented using pre-programmed hardware or firmware elements (e.g., application specific integrated circuits (ASICs), electrically erasable programmable read-only memories (EEPROMs), etc.), or other related components. In other implementations, the functionality of the described systems, and components, can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, +10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A computer-implemented method of determining the integrity of a stationary structure having a visually repetitive pattern, comprising the steps of:
  (a) using a light source and an optical element to produce an elongate substantially vertical light beam and directing the light beam at the structure while continuously moving laterally;
  (b) processing light reflected by the structure to produce a planar digital binary image, which image is continuously refreshed; and
  (c) identifying an anomalous feature from an anomaly in the repetitive pattern.

2. The method claim 1 wherein the anomaly is identified by comparison with a previous planar digital image.

3. The method of claim 1 wherein the anomaly is identified by a break in the visually repetitive pattern.

4. The method of claim 1 comprising the further step of automatically transmitting a notification of a detection event.

5. The method of claim 4 wherein the detection event is geotagged with location data.

6. A computer-implemented system for determining the integrity of a stationary structure having a visually repetitive pattern, the system configured to receive digital binary images from a imaging system comprising a light source and an optical element to produce an elongate substantially vertical light beam, which is configured to be directed at the structure while moving laterally, the system comprising a processor and at least one memory device in communication with the processor, the memory comprising processor-executable instructions to (a) process the images and (b) identify an anomalous feature from an anomaly in the repetitive pattern.

7. The system of claim 6 which is mounted on a remotely operated or autonomous vehicle.

8. The system of claim 6 further comprising a display/report module which stores a record of an anomaly correlated to a geographic position, or reports the anomaly and its geographic position to a remote user or system, or both.

9. The method of claim 1, wherein the stationary structure comprises a fence.

10. The method of claim 9, wherein the fence is a chain link fence.

11. The system of claim 6, wherein the stationary structure comprises a fence.

12. The system of claim 11, wherein the fence is a chain link fence.

\* \* \* \* \*